US012711506B2

(12) United States Patent
Cun

(10) Patent No.: US 12,711,506 B2
(45) Date of Patent: Aug. 18, 2026

(54) INTELLIGENT COST REPRESENTATION AND PAYMENT PREAUTHORIZATION FOR VEHICLE FUELING TRANSACTIONS

(71) Applicant: American Honda Motor Co., Inc., Torrance, CA (US)

(72) Inventor: David Wong Cun, Fountain Valley, CA (US)

(73) Assignee: American Honda Motor Co., Inc., Tokyo (JP)

( * ) Notice: Subject to any disclaimer, the term of this patent is extended or adjusted under 35 U.S.C. 154(b) by 0 days.

(21) Appl. No.: 18/950,700

(22) Filed: Nov. 18, 2024

(65) Prior Publication Data

US 2026/0141386 A1 May 21, 2026

(51) Int. Cl.
*G06Q 20/40* (2012.01)
*G01R 31/36* (2020.01)

(52) U.S. Cl.
CPC ......... *G06Q 20/4015* (2020.05); *G01R 31/36* (2013.01)

(58) Field of Classification Search
CPC ............................ G06Q 20/4015; G01R 31/36
See application file for complete search history.

(56) References Cited

U.S. PATENT DOCUMENTS 8,433,455 B2 * 4/2013 Siy .......................... B60L 58/12 701/1
8,798,831 B2 * 8/2014 Cho ........................ B60L 58/12 180/65.21
9,371,007 B1 * 6/2016 Penilla ............... G06Q 30/0259
10,198,892 B2 2/2019 Taylor et al.
11,697,581 B2 7/2023 Sahota et al.
2015/0120523 A1 4/2015 Lawrenson et al.
2016/0035001 A1 * 2/2016 Driscoll ............. G06Q 30/0631 705/26.7
2020/0387874 A1 12/2020 Chen et al.
2021/0005027 A1 * 1/2021 Handiaz ................. G06N 20/00
2021/0166163 A1 6/2021 Kim
2021/0327161 A1 * 10/2021 Diamond ................ B60L 53/60
2023/0038012 A1 2/2023 Erozlu et al.
2024/0294169 A1 9/2024 Basso
2024/0408994 A1 * 12/2024 Alexander ............. B60L 53/64

FOREIGN PATENT DOCUMENTS

CN 102542677 A 7/2012
CN 106503979 A 3/2017
CN 109146454 A 1/2019
CN 111582856 A 8/2020
CN 109979103 B 7/2021
WO WO-2019162749 A1 * 8/2019 ................ H02J 7/84
WO WO-2020182276 A1 * 9/2020 ......... G01R 31/3835
WO WO-2020259096 A1 * 12/2020 ........... G01R 31/382
WO WO-2021105071 A1 * 6/2021 ........... G01R 31/389

* cited by examiner

*Primary Examiner* — Daniel S Felten
(74) *Attorney, Agent, or Firm* — Plumsea Law Group, LLC

(57) ABSTRACT

Systems and methods for facilitating and optimizing pre-authorizations for anticipated re-fueling transactions for vehicles. A server may receive information about a vehicle's current location and fuel status along with other telemetry data. The server can predict how much fuel will be dispensed by the vehicle in an fueling event to occur at a target re-fueling station. A cost representation of this fuel can be calculated and used to perform highly accurate pre-authorizations of in anticipation of the upcoming transaction, before the vehicle arrives at the re-fueling station.

20 Claims, 10 Drawing Sheets

INTELLIGENT COST REPRESENTATION AND PAYMENT PREAUTHORIZATION FOR VEHICLE FUELING TRANSACTIONS

BACKGROUND

The present disclosure generally relates to increasing efficiency in payment pre-authorizations and improving consumer interactions with respect to electric vehicle (EV) charging transactions and, more particularly, to a system and method for predicting with great accuracy the cost of an EV's upcoming fuel purchase in order to optimize the payment processing experience.

Efficient payment processing is an essential feature for companies seeking to promote customer loyalty. Any perceived discrepancies or inconveniences during the payment process can subtract from a customer's experience and reduces the likelihood they would return for future purchases. Credit and debit card transactions have to pass through authorization (auth) or pre-authorization (pre-auth) to validate the information attached to a card and place a hold on a customer's funds. More specifically, in cases where the final amount of a transaction is not known at the time of sale, or a merchant simply wants to know that a customer has the money or credit they need to pay for something, a preauthorization charge can be employed. However, customers may not always be keen to engage in such transactions when the merchant estimation of a purchase that is submitted for the pre-auth is an amount that far exceeds the actual cost. This can be especially true in the context of electric vehicle fueling transactions, which are typically much lower in cost than traditional gasoline "fill-ups". It behooves the merchant to ensure the payment experience is optimal in the face of the increasing number of electric vehicles on the road.

Therefore, there is a need for a system that facilitates such coordination between merchants and consumers to effectively incorporate vehicle data into the generation of pre-auth estimates to optimize payment processing and address the shortcomings described above.

SUMMARY

The disclosed embodiments provide methods and systems for facilitating preauthorization of fuel purchases, before a vehicle physically connects to a fueling station and begins the re-fueling operation, based on highly accurate and nuanced predictions of a vehicle's fuel needs and anticipated transactions.

In one aspect, a method of optimizing payment processing for vehicle fueling transactions is disclosed. For example, the method may include receiving, at a remote concierge system, first telemetry data from a vehicle including a current location of the vehicle relative to a re-fueling station, and an indication that a fuel level of the vehicle has fallen below a first threshold. The method also includes predicting, at the concierge system, the vehicle has a high likelihood of traveling to the re-fueling station within a first window of time to purchase fuel, and estimating, at the concierge system, a first fuel amount that will be required to fully re-fuel the vehicle upon its arrival at the re-fueling station. The method can further include calculating, at the concierge system, a cost representation for purchase of the first fuel amount. In addition, the method includes transmitting, from the concierge system and before the vehicle is physically connected to a component of the re-fueling station, the cost representation and payment details for an account linked to the vehicle to a payment processor for the re-fueling station, and receiving, from the payment processor and at the concierge system, confirmation that the purchase of the first fuel amount has been pre-authorized.

In another aspect, another method of optimizing payment processing for vehicle fueling transactions is disclosed. The method includes: determining, by a concierge service for a vehicle, a fuel level of the vehicle has fallen below a first threshold; presenting, by the concierge service and via a display or speaker of the vehicle, a first notification: (a) indicating the fuel level has fallen below the first threshold, and (b) offering a selectable option for re-routing the vehicle to a re-fueling station; receiving, by the concierge service, acceptance of the selectable option; responsively (i.e., in response to the receiving the acceptance) causing a navigation application associated with the vehicle to generate and present a route to the re-fueling station; transmitting, from the concierge service and to a remote concierge system, a current location of the vehicle relative to the re-fueling station, and a current fuel level of the vehicle; and receiving, from the remote concierge system and at the concierge service, before the vehicle is physically connected to a component of the re-fueling station, a message indicating purchase of a first fuel amount has been pre-authorized.

In another aspect, a system for optimizing payment processing for vehicle fueling transactions includes a processor and machine-readable media including instructions which, when executed by the processor, cause the processor to: receive, at a remote concierge system, first telemetry data from a vehicle including a current location of the vehicle relative to a re-fueling station, and an indication that a fuel level of the vehicle has fallen below a first threshold; predict, at the concierge system, the vehicle has a high likelihood of traveling to the re-fueling station within a first window of time to purchase fuel; estimate, at the concierge system, a first fuel amount that will be required to fully re-fuel the vehicle upon its arrival at the re-fueling station; calculate, at the concierge system, a cost representation for purchase of the first fuel amount; transmit, from the concierge system and before the vehicle is physically connected to a component of the re-fueling station, the cost representation and payment details for an account linked to the vehicle to a payment processor for the re-fueling station; and receive, from the payment processor and at the concierge system, confirmation that the purchase of the first fuel amount has been pre-authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments may be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
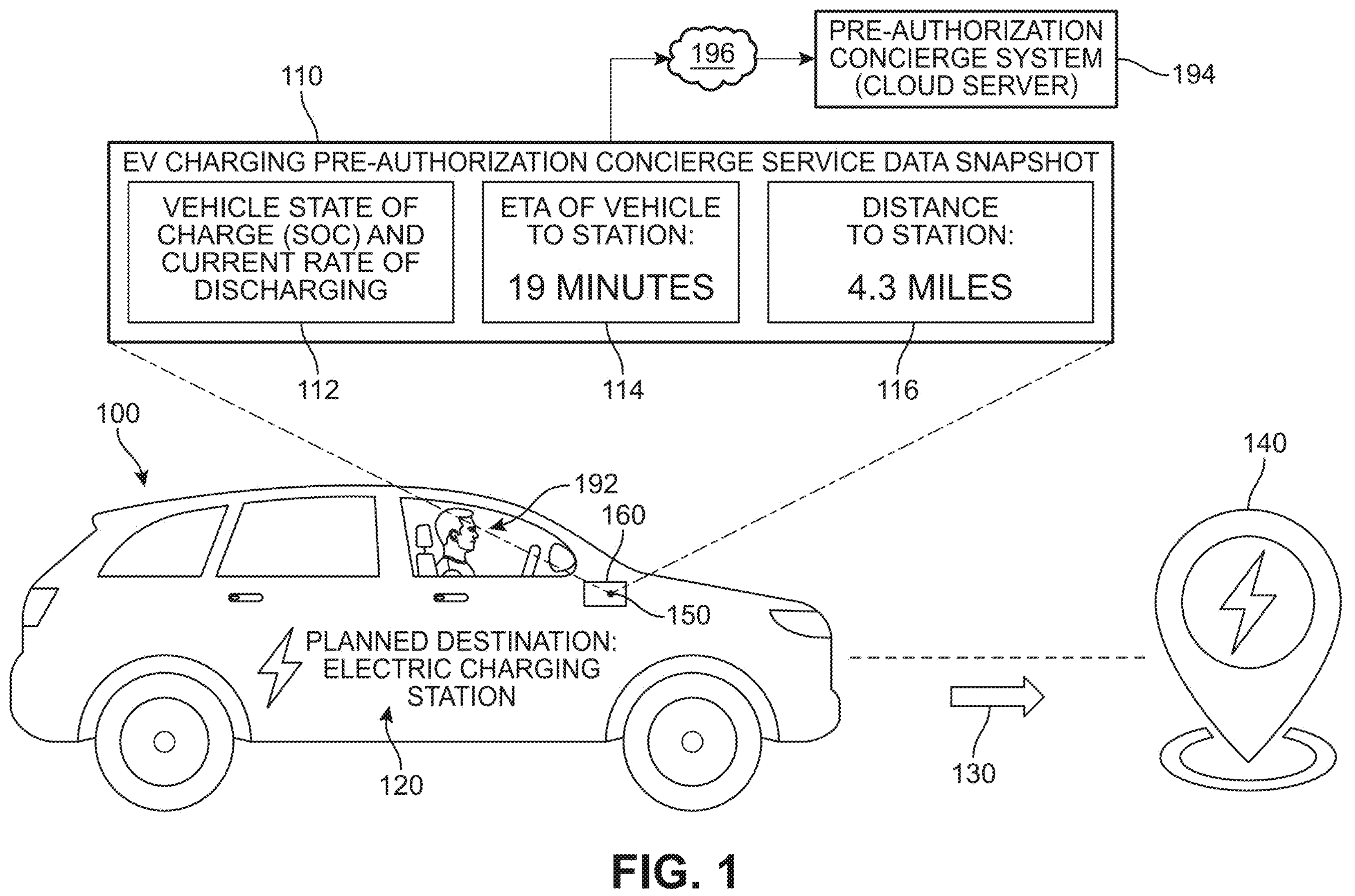
FIGS. 1 and 2 depict an example scenario in which a concierge system predicts a vehicle re-fueling event is imminent and generates a cost representation for the upcoming purchase in order to preauthorize the transaction, in accordance with an embodiment of the disclosure.

Merchant transactions generally involve authorization on a credit or other payment card or account. Pre-authorization settlement is a crucial step in the payment card transaction process, offering a way for merchants to verify the availability of funds on a customer's card before the transaction is finalized. This is essential for preventing fraudulent activity and ensuring that merchants have enough funds to cover the transaction. In such cases, when a customer swipes their payment card or otherwise presents the account data, the transaction will go through a pre-authorization process. During this process, the merchant sends a request to the card issuer for authorization to charge the customer's account. The card issuer then verifies the funds are available and places a hold on the appropriate amount.

Once the pre-authorization process is complete, the transaction can be settled. Settlement occurs when the funds are actually transferred from the customer's account to the merchant's account. The process of settlement is typically done at the end of the day. The funds that are pre-authorized are typically held on the customer's account for 24-72 hours. During this time, the merchant has the option to reject or accept the transaction. If the merchant accepts the transaction, the hold on the funds is released and the funds are transferred to the business'bank account. Pre-authorization settlement is used by merchants to ensure that transactions are legitimized before they are finalized, which can help prevent chargebacks and other fraudulent activities. This process is especially important for high-risk industries, which are industries that are more likely to have fraudulent transactions due to the nature of their business.

Thus, a preauthorization charge ("preauth") allows a merchant to estimate the final cost of a product or service and request the customer's bank or card issuer to put a hold on that amount on their account. This hold is temporary and, in most cases, will generally fall off on its own after seven days or less. However, the exact number of days varies from business to business, as defined by merchant category codes (MCCs). Sometimes a preauth can linger for 31 days, although most businesses will settle the cost much sooner than that, capturing the final amount or releasing the hold. During that period, the customer's bank or other funding source will reduce their account or credit line to reflect the charged preauth amount. Once the transaction is complete, the process of settling the funds can occur on the back end, usually taking 24-48 hours.

While essential for protecting merchants, preauthorization charges limit the available amount of cash in a checking account or credit on a credit line. Sometimes a preauth is a low value (e.g., $1.00 USD), which is acceptable to all but the most financially distressed consumers. However, in other cases, a preauth is $50, $100, or $200. Higher preauth amounts can create a serious inconvenience for many consumers. With bills already needing to be paid (mortgage, rent, utilities, subscriptions), the consumer is left with little immediate disposable cash for discretionary and even staple purchases, presenting an obvious inconvenience.

Most consumers assume that the merchant is at fault for the preauth lingering for so long. They may develop a negative perception of that merchant. However, the merchant is generally not responsible for the timeline of the preauth, and is dependent on the card issuer. The customer may also be upset because the amount is not reflective of how much they actually spent. For example, they may see a preauthorization transaction of $60 or more at a gas or other vehicle re-fueling station when they know they only spent $15. If they call the merchant or their bank, they'll be told that the hold is temporary, and no one in a customer-facing role can tell them exactly when it will disappear. The 24-48 hours they're told it will take for it to go away can seem very far on the horizon.

In some cases, the processor/gateway may authorize a higher amount than the transaction total as a safeguard against undercharging. This is common with vehicle fueling stations where the final sale amount remains unknown until the fueling session is complete. For example, the gas station does not know the final transaction amount, and they don't know if the customer has sufficient funds to cover it. As of 2022, payment processors such as Visa and Mastercard increased the preauthorization charge limits at gas stations by 40%, raising the upper limit from $125 to $175. The gas station sets its own amount (within that limit). Before allowing the customer to begin re-fueling, the merchant wants to make sure there are enough funds in the customer's bank account or enough available credit on their credit limit to purchase a tank of gas or a full charge. Therefore, they may preauth around $50-75 from a customer's account since they can assume that amount covers the fuel a customer will probably need. However, there are many cases where the preauth amount is too high, leading to a hold on funds beyond the customer's cost, or too low, leading to opportunities for customers to engage in fraud.

A merchant can attempt to reduce customer frustration by establishing and presenting clear signage about preauth amounts and timelines. For instance, signage at a gas station can say that consumer cards may be preauthorized for a fixed amount until the final price is adjusted and settled within 48 hours (or something similar), directing the customer to contact their bank if there are any problems. However, this may not be enough. Hotels already do this and still experience a sizable amount of customer frustration. Guests know the hotel will charge $100 for incidentals. But some customers become upset if the charge takes more than 24 hours to go away.

Another approach is modulating the amount of the preauthorization charge when a customer arrives at the pump. While merchants want to mitigate risk and make sure the preauth fully covers the upcoming fueling event, they do not want to create a negative experience for their customer base. Most Americans are living paycheck to paycheck and every charge (even temporary) that is beyond the cost of their actual transactions can impact the customer experience. In some cases, the preauth transaction may even show up as an unexpected alert on the customer's account, making them wary for card activity that they may not have intentionally approved after the fuel has been dispensed. Of course, the challenge of accurately predicting/forecasting the cost of a customer's fueling transaction has limited the ability of merchants to select a preauth amount that could satisfy both parties. Furthermore, the customer (e.g., driver), upon arrival at their chosen fueling station, will be required to engage in a series of steps involving presentation of their payment card or other token that would initiate the preauthorization sequence, followed by another delay as the preauth is submitted and determined to succeed or fail. The driver must participate in this "manual" effort in order to verify their standing as a customer in good standing with funds available for the imminent transaction, regardless of the weather conditions or whether they have physical disabilities that make their temporary exit from the vehicle a burden of both time and comfort.

In order to address these and other drawbacks to the preauthorization process, the disclosed embodiments provide methods and systems for optimizing payment processing at vehicle refueling stations, such as gas stations, and in particular at electric charging stations. While still small in both absolute size and market share, the electric vehicle (EV) market is one of the most rapidly changing and fastest growing high-tech sectors in the global economy. According to some estimates, sales of electric vehicles could account for one-fifth of new car sales globally by 2025; more bullish projections see EVs taking 50% of sales or more by 2030. The implications for electric utilities, customers, service providers, and vehicle owners are far-reaching and rapidly evolving. Beyond the environmental and cost-related benefits associated with EVs, there are further advantages related to their operation, not the least of which is the highly granular data that can be harvested from their use due to the increasingly sophisticated techniques available to accurately estimate the power/energy consumption of EVs in real-time. These techniques are being developed due to the critical importance of the state of charge in optimizing electric vehicle performance. In other words, to promote customer confidence and support steady growth in electric vehicle adoption rates, accurate estimation of battery state of charge and maintaining battery state of health through optimal charge/discharge decisions are essential. Indeed, vehicle manufacturers have begun to employ machine learning (ML) techniques to improve state-of-charge management to better inform drivers about both the short-term (state of charge) and long-term (state of health) performance of their electric (or hybrid) vehicles, allowing drivers to make informed and dynamic energy usage decisions.

In different embodiments, real-time data, as well as historical data, can be harvested from each electric vehicle, as well as up-to-date data describing dynamic real-world conditions and metrics. As will be discussed in greater detail below, this data can be used by the proposed systems to generate highly accurate predictions of the anticipated state of charge (SOC) of the vehicle's battery when they reach a particular EV charging station. In addition, based on each prediction, a highly accurate estimate of the cost for a "fill up" upon arrival of the EV at the charging station can be calculated by reference to the schedule of cost (tariffs) for electricity and the estimated time of arrival of the vehicle, and then shared with the merchant's payment processor. In different embodiments, this estimated cost can then serve as a reliable measure of what the amount of the preauth should be. Rather than "guesstimating" (e.g., guessing and/or estimating) or simply requiring a uniform placeholder value to be preauthorized, the merchant can submit a customized amount that is directed to the charging needs of each individual vehicle. In other words, the pre-authorization amount may be modulated on a case-by-case basis using data that was collected before the final charge to calculate the predicted energy need of the user at the time that their vehicle arrives at the charging station. Using the proposed systems, the preauth selected can fall within 1-5% of the actual cost of the completed transaction, and payment processing platforms (such as Stripe®, Paypal®, Square®, Braintree®, etc.) may be more willing to use this cost representation.

Furthermore, because the prediction can be generated while an EV is still at some distance from the charging station (e.g., traveling toward a target charging station), the preauth can be submitted before the EV even arrives. In different embodiments, the system can apply stored driver account data, enabling the merchant payment processor to communicate with the driver's account to complete preauthorization of a credit card transaction in advance of the vehicle's arrival, removing the burden on the driver to engage in the preauthorization process and reducing the time needed to complete their charging session. Furthermore, if there is an issue (e.g., insufficient funds, card declined, card expired, etc.) with the driver's payment method, by "front-loading" the preauthorization event, the driver can receive notification of this issue before they arrive at the charging station and "plug in" to the electric supply. Such a framework thereby allows the driver an opportunity to make updates or provide alternate payment sources while they are still in the comfort of their vehicle rather than learning of the issue on-site (e.g., standing outside at a kiosk). Similarly, if preauth is successful, notification of this success can also be delivered to the driver while they are still in their vehicle, bolstering their decision to re-fuel at the selected charging station.

Figure 2:
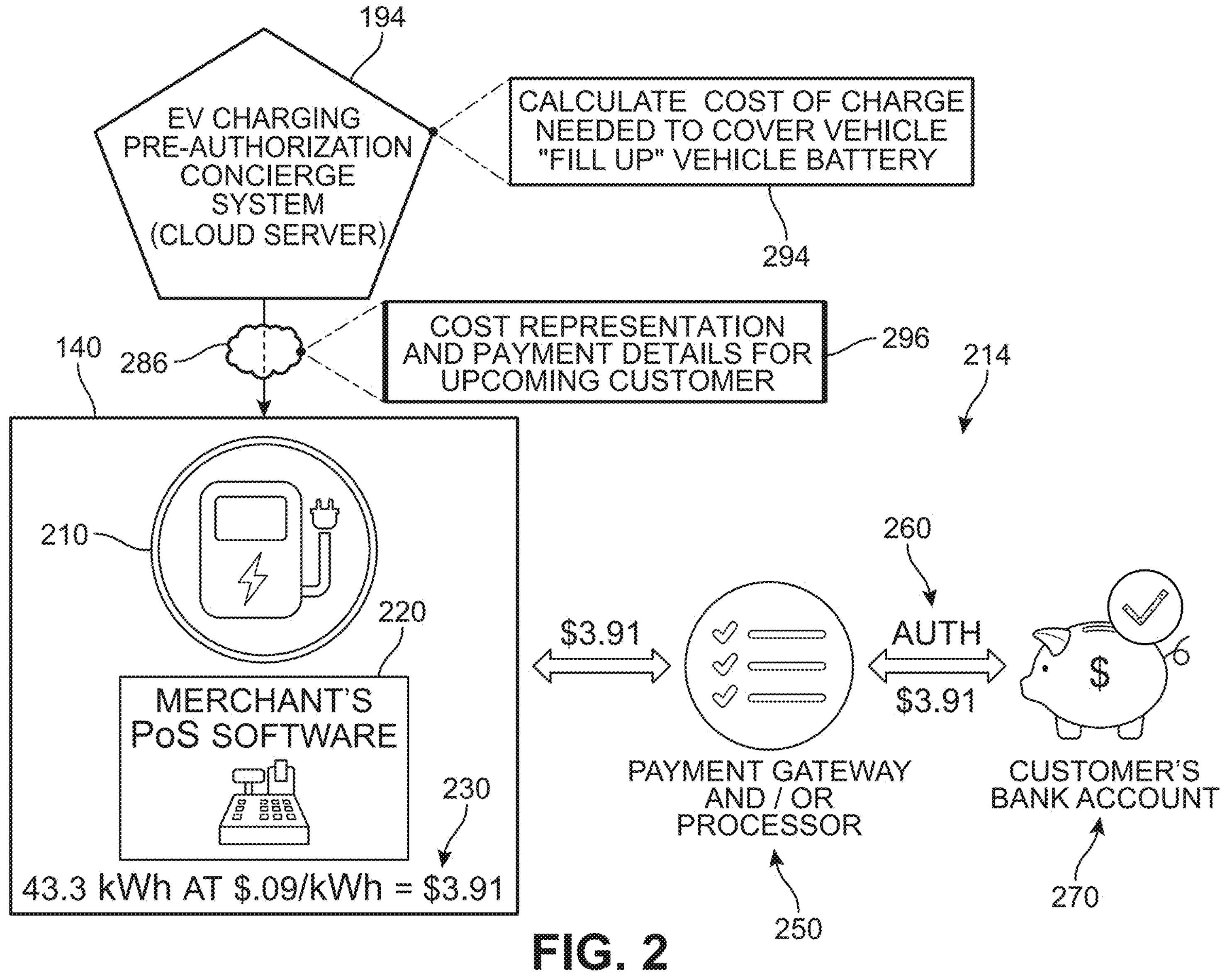

For purposes of introduction to the proposed payment processing optimization systems for anticipatory preauthorization cost representations, FIGS. 1 and 2 depict an example scenario in which vehicle data for an electric vehicle (EV) is used to predict the EV's expected SoC upon arrival at a particular charging station ("target destination"). As a general matter, the performance and longevity of an EV heavily depend on the efficient management of its energy storage system, with one of the critical parameters being the SoC of the battery. The SoC represents the amount of energy stored in the battery relative to its maximum capacity and serves as a crucial metric in determining the available driving range and overall performance of the vehicle. Precise SoC estimation and management are imperative not only for optimizing the vehicle's fuel economy but also for ensuring the reliability and durability of the energy storage system. Thus, various techniques in SoC estimation, which is specifically focused on predicting the current state of the battery, can be employed by the proposed systems.

In different embodiments, the vehicles described herein may be non-autonomous vehicle, semi-autonomous vehicles, or fully autonomous vehicles, for example, as defined by National Highway Traffic Safety Administration (NHTSA). Examples of the vehicles may include, but are not limited to, a three-wheeler vehicle, a four-wheeler vehicle (or a vehicle with any number of wheels), a hybrid vehicle, or a vehicle with autonomous drive capability that uses one or more distinct renewable or non-renewable power sources. The vehicles may use renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicles may have load carrying capabilities that uses one or more distinct trailers. It should be noted here that the vehicle shown in FIG. 1 are four-wheeler vehicles, which is merely an example.

As a general matter, vehicle(s) used in the embodiments herein may include suitable logic, circuitry, and/or interfaces, which may be configured to receive fuel (e.g., gas, electric charge, hydrogen, etc.) to run different electronic or electrical components/devices of the vehicle. The vehicle may be a non-autonomous, a semiautonomous, or an autonomous vehicle. Examples of the vehicle may include, but are not limited to, an electric vehicle, a hybrid vehicle, internal combustion vehicle, hydrogen powered vehicle, and/or a vehicle that uses a combination of one or more distinct renewable and non-renewable power sources. Thus, the term EV is used inclusively to refer to plug-in electric vehicles that are variously referred to in the literature as plug-in hybrid electric vehicles (PHEVs), extended range electric vehicles (EREVs), all-electric vehicles (AEVs), battery electric vehicles (BEVs), and plug-in electric vehicles (PEVs), and other hybrid vehicles. In different embodiments, the vehicle that uses renewable and non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle may further include an electronic apparatus such as an onboard computing system that may be configured to communicate with a remote server over a communication network (e.g. network 196).

The electronic apparatus associated with the vehicle may include suitable logic, circuitry, interfaces, and/or code that may be configured to communicate with the server on behalf of the vehicle over the communication network. The electronic apparatus may be an in-vehicle infotainment system that may be integrated with the vehicle. The in-vehicle infotainment system may include suitable logic, circuitry, interfaces and/or code that may be configured to render at least an audio-based data, a video-based data, and/or a user interface to an occupant of the vehicle. The in-vehicle infotainment system may be configured to execute one or more operations associated with the vehicle. Examples of the in-vehicle infotainment system may include, but are not limited, an entertainment system, a navigation system, a vehicle user interface (UI) system, an Internet-enabled communication system, and other entertainment systems. In some embodiments, the electronic apparatus may be the electronic control unit (ECU) of the vehicle or an electronic dashboard of the vehicle. In other embodiments, the electronic apparatus may be a portable device that may be associated with the occupant of the vehicle. Examples of the portable device may include, but are not limited to, a computing device, a smartphone, a cellular phone, a mobile phone, a gaming device, a camera device, a computer work-station, a personal digital assistant (PDA) and/or a consumer electronic (CE) device.

Referring to FIG. 1, a driver 192 is navigating toward a first charging station 140 located at a first address. In this case, the driver 192 has provided one or more inputs to a navigation application 120 for an onboard computing system 160 of their first electric vehicle ("first vehicle") 100, which registers the first charging station 140 as the vehicle's planned destination. In response, an onboard GPS can facilitate development and presentation of a route 130 that directs the first vehicle 100 toward the first charging station 140. Thus, for purposes of this example, the first vehicle 100 is now headed toward, but has not yet arrived at, the first charging station 140. Upon receiving, at the navigation application, the selection of the destination, an electric vehicle pre-authorization concierge service ("concierge service") 150 provided by or onboard the first vehicle 100 can determine that the destination corresponds to a refueling merchant. In response to this determination, the concierge service 150 collects real-time vehicle status, operational, and usage data and generates a data snapshot 110. In some embodiments, the data snapshot 110 can thereby include a variety of data mined from the vehicle itself and its onboard sensors. For example, the data snapshot 110 in FIG. 1 includes the first vehicle's current state of charge (SOC, e.g., 25%) 112 along with its current rate of discharge (i.e., based on recent historical battery usage and the speed at which the battery is discharging, e.g., 5% per minute), an estimated time of arrival 114 (e.g., 19 minutes) of the first vehicle 100 at the first charging station 140, and a distance 116 (e.g., 4.3 miles) of the first vehicle 100 from the first charging station 140. This data snapshot 110 can be transmitted from the concierge service 160 via an onboard communications network module, over a network 196, to a remote concierge system 194.

In different embodiments, the communication network 196 may be one of a wired connection or a wireless connection. Examples of the communication network 196 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The process that was initiated in FIG. 1 is continued in FIG. 2, where the remote concierge system 194, based at least on the received data snapshot, performs a calculation 294 that estimates what the cost of the charging of the first vehicle will be when the first vehicle arrives at the first charging station 140. This calculation 294 is then shared as a cost representation 296 linked to the prospective customer's account (e.g., driver 192) over a network 286 with a payment processing platform associated with first charging station 140. For example, a merchant's point of service (PoS) software 220 can receive the cost representation 296 and present this amount as a preauth amount 230. The preauth amount 230 is then passed through a payment ecosystem 214. In this example, the PoS software 220 can communicate with payment gateway 250 that can comprise software or API (e.g., Stripe®, PayPal®, Adyen®, Braintree®, etc.) and/or accept payment transaction information as it securely communicates with a payment processor.

In different embodiments, the payment gateway 250 can then transfer the information to the merchant's acquirer or acquiring bank. The acquiring bank (either directly or through an ISO) can employ an acquirer processor (the "front-end processor") to then transmit data from the gateway to the appropriate card networks (and back) (e.g., First Data®, Worldpay®, Elavon®, Chase Paymentech®, Global Payments®, etc.). In general, card networks supply the electronic infrastructure that enables the processors and banks to communicate and process transactions in real-time (e.g., Visa®, Mastercard®, AmEx®, Discover®, etc.). The card networks can connect to an issuing bank 270 that serves as the underwriter for the payment account and can confirm to the card networks that the information provided is legitimate (authentication) and funds up to the preauth amount are available (authorization 260). The card networks then pass this response back to the acquiring bank, which sends the message on to the merchant via the payment gateway 250. Once this process is complete, the merchant PoS software 220 can confirm a successful preauthorization event has occurred. When the first vehicle arrives at the first charging station 140 and connects their vehicle to a charging pump 210, the transaction has already been authorized and the charging session can begin immediately. Thus, in different embodiments, the authorization can be performed wirelessly, before the vehicle has even been physically connected to the charging station. In some embodiments, in cases where the first vehicle does not complete the trip to the selected first charging station 140 within a pre-designated period of time (e.g., 30 minutes, one hour, two hours, six hours), the payment ecosystem 214 can be configured to automatically cancel the preauth and release the held amount (e.g., authorization 260). In addition, if the cost of the amount of fuel that was received by the vehicle differs from the preauth value, a final adjustment can be made by payment gateway 250 before the transaction settlement.

Figure 3:
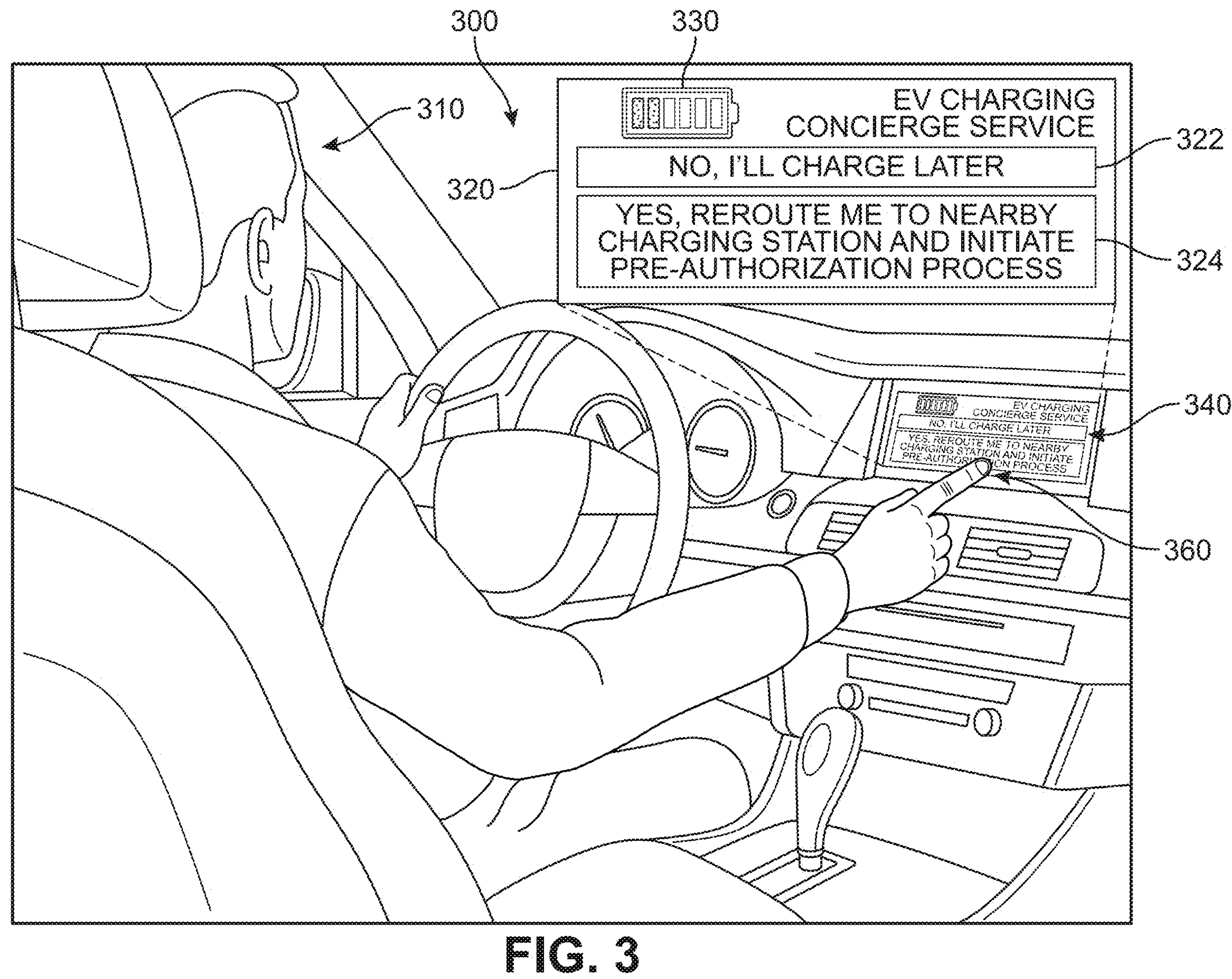
FIG. 3 shows an example of an onboard concierge service presenting a notification to a driver of a vehicle regarding their fuel level, in accordance with an embodiment of the disclosure.

To provide greater context to the reader, FIGS. 3, 4, 5, 6A, 6B, and 6C depict an example scenario in which an embodiment of the proposed systems and methods can be implemented. In FIG. 3, a second vehicle 300 is shown with a second driver 310 in the process of confirming a navigation operation to a target destination. More specifically, in this case, an EV charging concierge service 320 for the second vehicle 300 can monitor and estimate, in real-time, an SoC 330 for the vehicle's battery, and detect when the SoC 330 falls below a pre-set trigger threshold.

In different embodiments, the proposed systems can employ one or more machine learning (ML) techniques to perform SoC estimations. One advantage of ML lies in its adaptability to diverse driving conditions, continually enhancing SoC estimation accuracy through continuous learning from historical data. Machine learning models, such as RNNs and LSTM networks, as well as Support Vector Machines (SVM) and ensemble learning, can be used to continually refine predictions based on real-world driving patterns, leading to more accurate and adaptive SoC estimates. For example, ML algorithms can dynamically adjust SoC estimates to account for battery aging effects, ensuring accurate representation of the battery's state. These models can incorporate aging models to provide precise SoC estimates that consider the battery's current condition.

In some embodiments, once the SoC level falls under the threshold, the concierge service 320 can automatically present a notification describing the SoC level to the second driver 310 via a display 340 for the infotainment system, or as an audio (spoken) message. In some embodiments, the concierge service 320 can also present selectable options for responding to the notification, such as first option 322 (continue without further action: "No, I'll charge later") and second option 324 (initiate a routing to a new destination: "Yes, reroute me to nearby charging station and initiate pre-authorization process). In response to the concierge service 320 receiving a selection 360 (in this example, of second option 324) from the driver 310, the concierge service 320 can coordinate with/send a control signal to the onboard navigation system to generate a route to the selected target (e.g., the nearest charging station). At or around the same time, in response to recognition of charging station as the vehicle's destination, the concierge service 320 can launch a set of operations to perform preauthorization, as introduced above, and described in greater detail below.

Thus, some embodiments of the proposed systems include a navigation/mapping application ("navigation app") accessed via a computing device such as a mobile phone or the vehicle's onboard computing device. In some embodiments, the navigation app can generate an interactive map by which the second driver 310 can plan their route and identify nearby places of interest (such as fueling stations). For purposes of this application, a fueling station refers to any physical site where some type of fuel that may be used by a vehicle is supplied, including but not limited to electric charging, gasoline pumps, hydrogen, etc.

In other embodiments, rather than occur in response to detection of the SoC level falling below a preset threshold, this event can occur in response to a driver's manual intervention. For example, in cases where the driver considers the vehicle battery's current SoC and their driving needs, they can decide to select a charging station as a new target destination. As the second vehicle 300 has a battery, the second driver 310 could request a search for fueling stations that would provide electric charging (e.g., they could initiate a search via the navigation app for "gas stations near me"). However, in other examples, any other vehicle engine type with other fueling systems may benefit from the proposed embodiments. Thus, for purposes of this application, the term "fuel" should be understood to broadly encompass any type of fuel that may be used to power a vehicle, including but not limited to: gasoline, electricity, biodiesel, including vegetable oils, animal fats, or recycled restaurant grease, etc., ethanol, including fuel made from corn and other plant materials, atomic reactor-based fuels, petroleum, hydrogen, natural gas, propane, renewable diesel, sustainable feedstock-based fuel, biobutanol, dimethyl ether, methanol, renewable gasolines, etc. In other words, the proposed systems and methods should be understood to support navigation, and the collection of vehicle fueling state data, vehicle fuel consumption data, vehicle operation data, vehicle load, etc. for the purposes of predicting the vehicle's fueling needs upon arrival at a particular fueling station. Any reference to one type of fuel (e.g., gasoline, etc.) in examples described herein are thereby to be understood to be interchangeable with any other fuel type (e.g., electricity, etc.), and should not be understood to limit the applications of the embodiments.

In some embodiments, in response to the control signal from the concierge app, or a manual request submitted by the driver, the navigation app can generate and present an interactive map that calls out or otherwise visually indicates where different gas stations are located in their local area. In some embodiments, the navigation app can access a database of fueling stations appropriate for the second vehicle and generate a map that routes the second vehicle to the location. Based on this map, the second driver 310 can continue their travels until reaching the targeted fueling station. However, in some embodiments, for many reasons (e.g., on the way to another destination, traffic, schedule, etc.) they may opt to select a different charging station than the one automatically offered by the navigation app as the "nearest".

In different embodiments, once a target charging station has been selected and the second vehicle 300 is enroute, the concierge service 320 can perform a data snapshot capture whereby one or more types of data regarding the vehicle's usage and status are collected. In some embodiments, the snapshot can also include historical driving data for the driver that can offer insights into their typical driving habits. Smooth acceleration and deceleration, as well as maintaining a steady speed, can contribute to lower energy consumption. Regenerative braking, which recovers energy during deceleration, is a feature in many EVs that positively impacts energy efficiency. The aforementioned features may be incorporated or included in the historical driving data snapshot.

In some embodiments, the navigation app can share, via network connection 490, with the concierge service 320 data regarding the mileage or distance to the target charging station from the vehicle's current location. In different embodiments, the concierge service 320 can further collect data that can be used to determine approximately how much fuel would be depleted to reach the target fueling station, and the total fuel that would be required to re-fill their tank, battery, or other fuel system.

Figure 4:
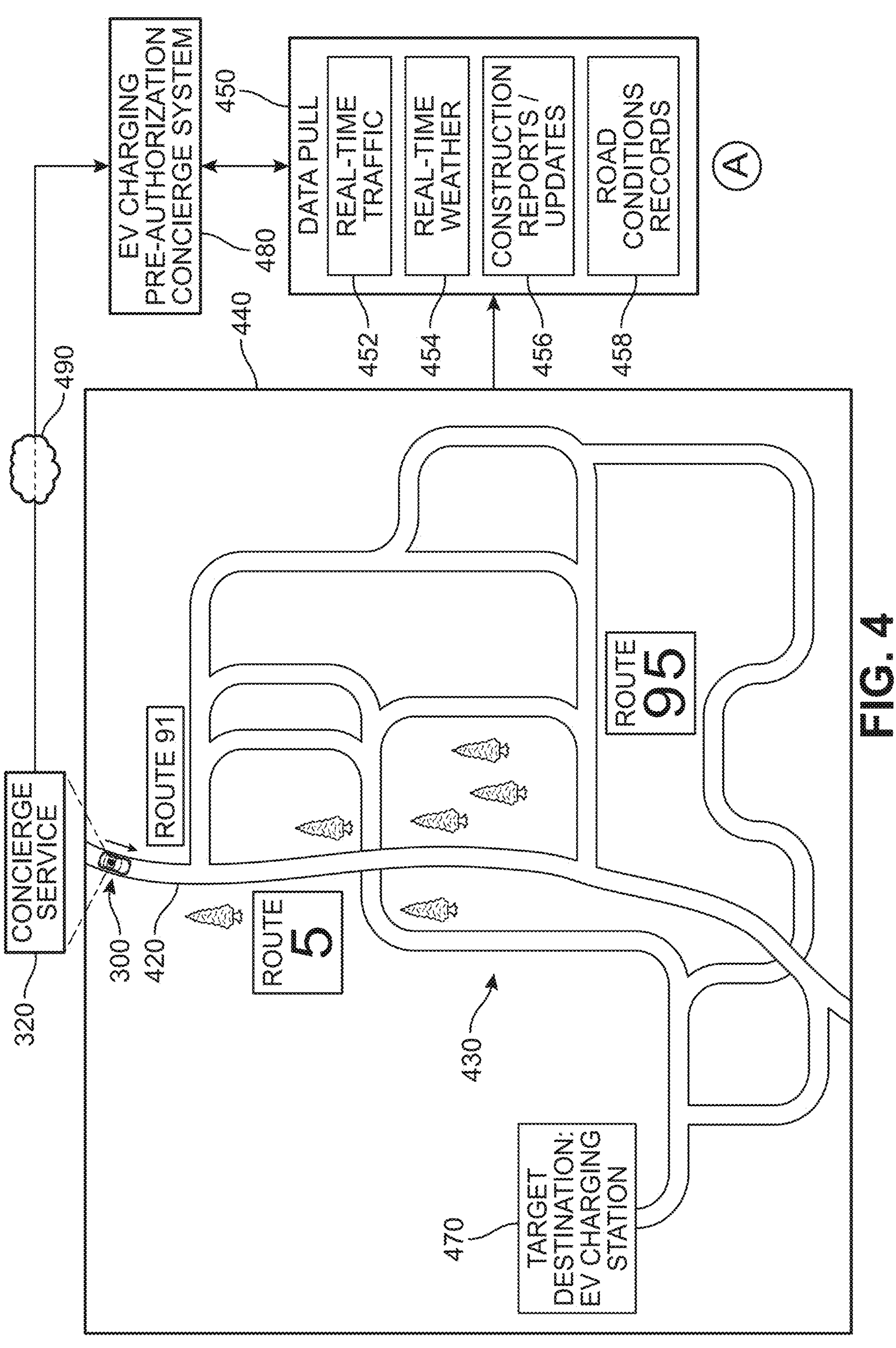
FIG. 4 is a schematic diagram showing examples of data that can be used by the concierge system to fine-tune the cost representation of the upcoming fuel purchase, in accordance with an embodiment of the disclosure.

It can be appreciated that in different embodiments, the amount of fuel that is used/depleted as the vehicle as it travels to the target destination can vary not only due to vehicle-specific factors (e.g., battery model, age, charging cycles, etc.) and usage factors (e.g., weight of occupants and other cargo, systems used by occupants such as HVAC, etc.), but external factors as well. For example, in some embodiments, along with the data snapshot of vehicle operations captured by the onboard concierge service and shared with the remote concierge system, additional data may also be harvested to provide further clarifying insights about the vehicle's planned journey and its most likely energy consumption. FIG. 4 depicts a bird's eye view map 440 for the benefit of the reader, representing various roadways 420 that would lead to the second driver's selected destination (second charging station 470). The second vehicle 300 is currently at a first location/position on a highway. Based on the vehicle's current position, and selected route 430 along roadways 420 that is being traveled based on the output of navigation app, remote concierge system 480 can request and pull real-time environmental data 450 for each roadway (e.g., from a third-party database/service) including—for each road of route 430—real-time traffic 452, real-time weather 454, construction reports/updates 456, and road conditions records 458. This data pull will be referred to as optional Stage (B) for purposes of FIG. 5 below. In other embodiments, additional or different aspects of the road and environment can be obtained that could impact the amount of fuel that is consumed by the second vehicle 300 as it travels to the second charging station 470, such as but not limited how windy the road is, how many stop signs, how many traffic signals, whether there are hills and the extent of the hilliness, etc. In some embodiments, weather conditions can also represent variables in the energy consumption, such as strong tail winds or front winds, heavy rain, freezing cold, or heat. Extreme temperatures, whether hot or cold, can affect the performance of the vehicle's battery. Cold weather, in particular, may reduce battery efficiency and overall range.

In different embodiments, there may be other conditions that can trigger the preauthorization other than the detection of a target destination corresponding to a charging station. For example, in some embodiments, the concierge service can instead or alternatively be configured to detect when the vehicle is within a particular range (geofence) of a driver's preferred charging station. Thus, proximity to a fueling station can also trigger the preauthorization procedure in one embodiment. In some other embodiments, proximity as well as another factor can trigger preauthorization, such as the SoC falling below a predesignated threshold while the vehicle is within that geofenced zone, or a user manually inputting a request at the concierge service to initiate the preauthorization sequence. In another example, if the concierge service detects that the vehicle has arrived at a charging station, and/or has parked at a charging spot, and/or vehicle data indicates the fuel lid door has been opened (e.g., in anticipation of plugging in for charge), the vehicle concierge service can communicate with the remote concierge system to trigger the preauthorization procedure before the vehicle is plugged in or the driver exits the vehicle.

Figure 5:
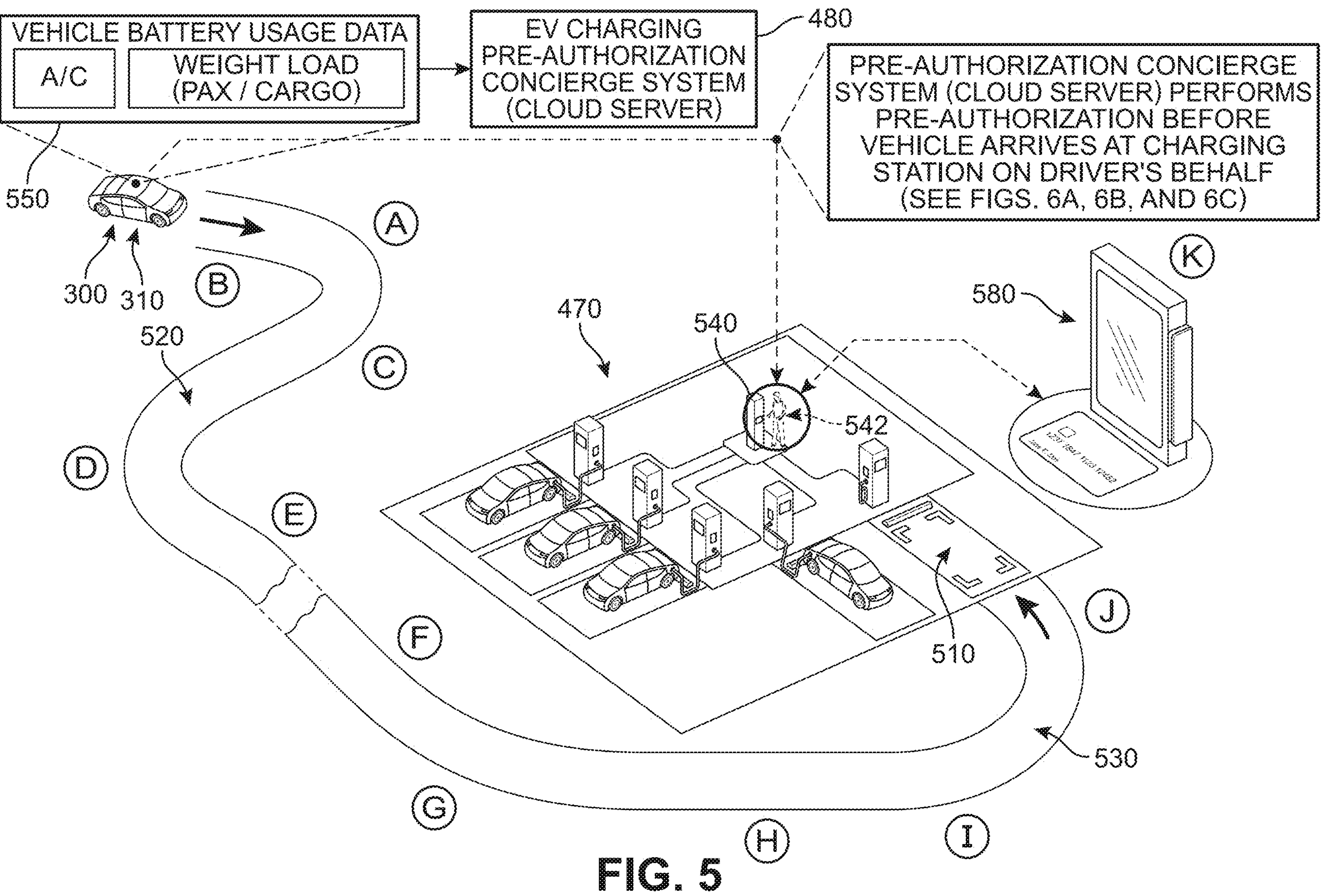
FIGS. 5, 6A, 6B, and 6C collectively show a schematic diagram in which an example process of performing preauthorization is depicted, in accordance with an embodiment of the disclosure.
Figure 6A:
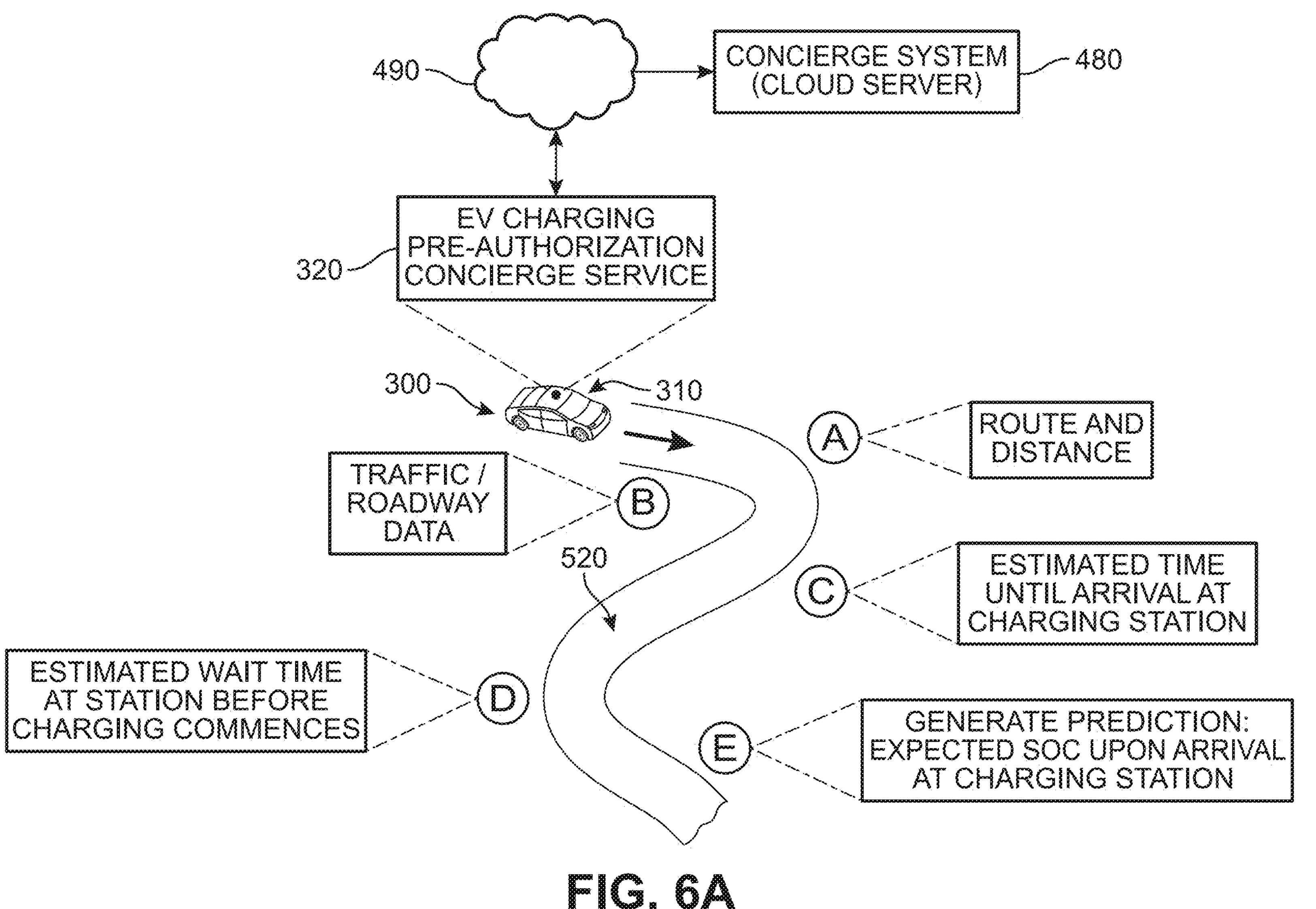
Figure 6B:
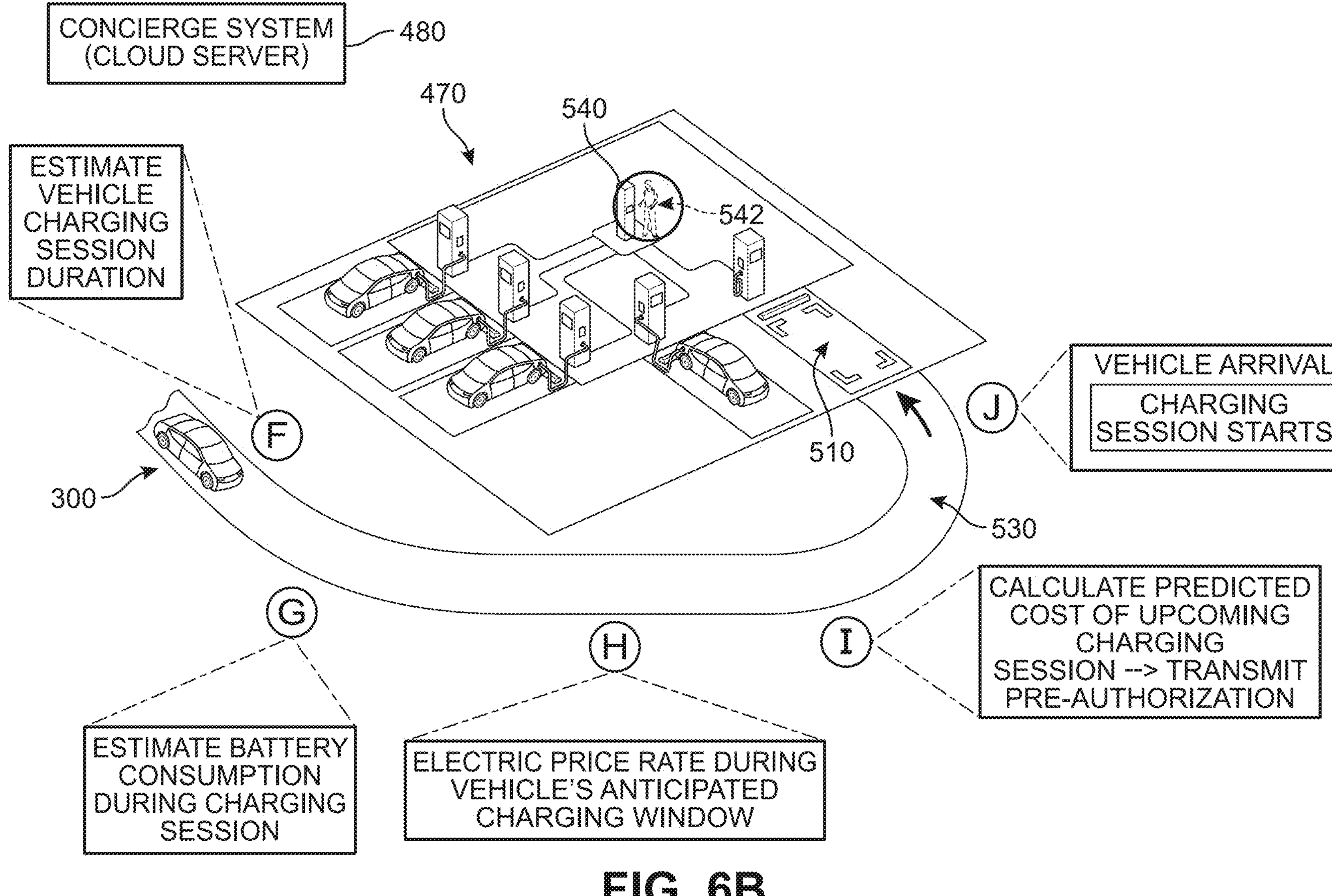
Figure 6C:
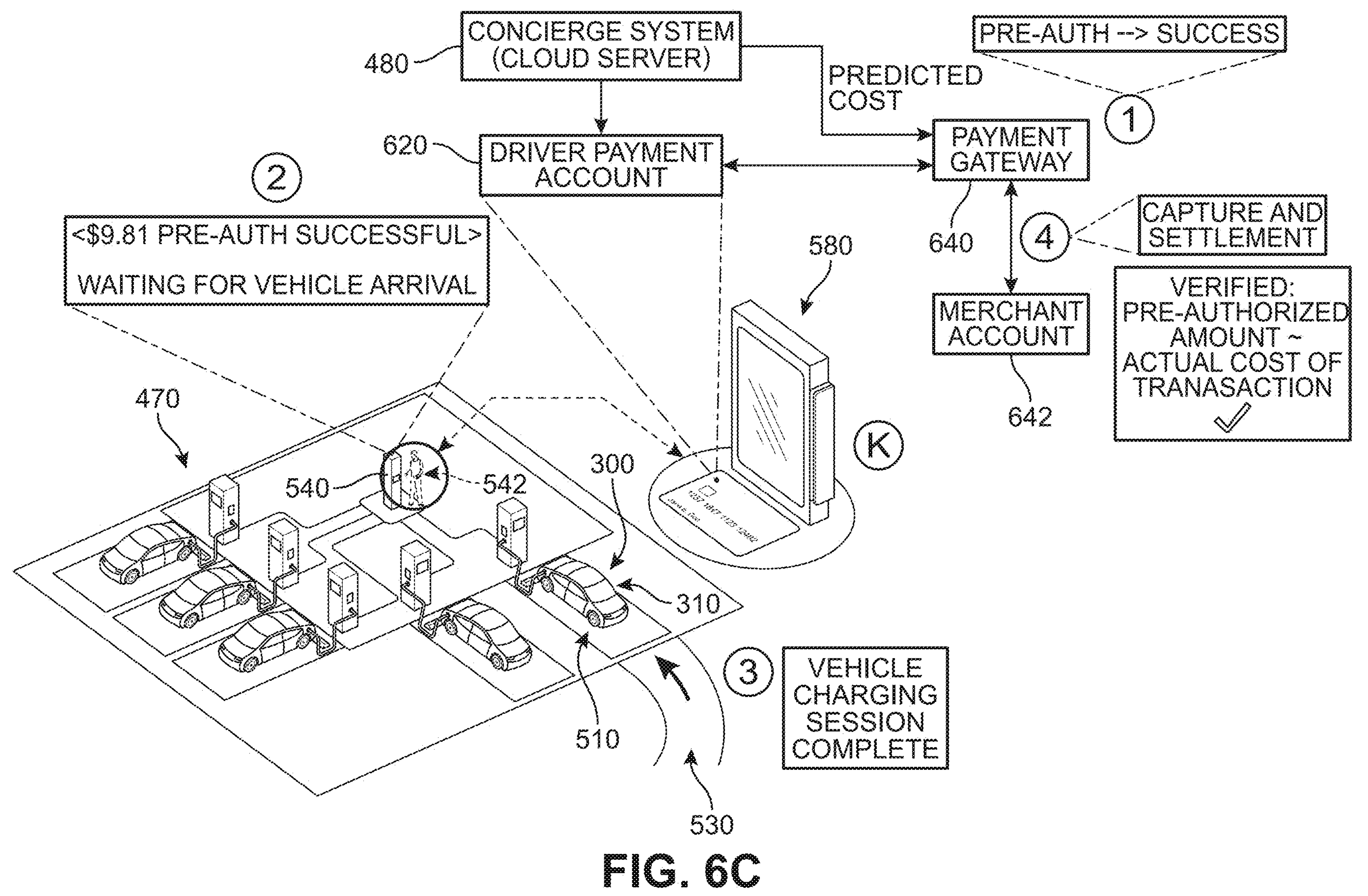

For purposes of clarity for the reader, an overview of the preauthorization sequence that can be launched via the concierge service is now presented in FIG. 5, with further details being provided by reference to FIGS. 6A, 6B, and 6C. In FIG. 5, a schematic flow diagram following a set of stages (A)-(K) offers a high-level understanding of an embodiment of the proposed systems and methods. The second vehicle 300 is shown enroute to the second charging station 470. As noted earlier, in response to a triggering event indicating the second vehicle 300 is headed toward a charging station, vehicle-related data such as battery load activity (battery usage data 550) and telemetry data can be shared via the onboard concierge service with the remote concierge system 480, along with the current SoC data. In response to the triggering event and based on this received vehicle-related data, the concierge system 480 can perform a sequence of preauthorization stages in anticipation of the upcoming charging session. In other words, the process described herein can serve as a digital surrogate or proxy 542 that performs certain actions on behalf of the second driver 310 that involve a payment ecosystem 580 associated with the selected merchant (without requiring the second driver to be present in person and interacting with a payment kiosk 540).

In different embodiments, battery usage data 550 can encompass a wide range of vehicle activity data. For example, in some embodiments, a driver profile linked to the vehicle can store historical behavior of the prospective customer that can indicate the likelihood that the driver will decide to wait in their car while they are charging the vehicle (rather than go into a restaurant or other area). In such cases, the data can also indicate whether the driver typically operates their HVAC system (AC or heat) while waiting, which will incrementally increase their electricity consumption, affecting the total amount of electricity that will be dispensed. In some embodiments, this evaluation can alternatively be based on historical behavior not of the driver 310, but collective users at that location.

In addition, in some embodiments, the battery usage data 550 can include specifications describing the vehicle battery (typically the battery that was supplied by the original equipment manufacturer (OEM), but could also be a different, replacement battery). Thus, in some embodiments, the make or model of the battery itself can be a factor that determines how the concierge system will calculate preauth, as well as the age of the battery. In different embodiments, the concierge system 480 can also make reference to historical data captured in a database describing the performance profile of the specified battery when installed in the particular make/model vehicle. Such information can impact the calculation of initial energy assumptions, as different batteries will have varying efficiencies and chemistries that affect how the fuel will be consumed.

Furthermore, in different embodiments, current vehicle activity and load can be used by the concierge system 480 to fine-tune the SoC-at-arrival estimate. For example, if the second driver 310 maps their way to the second charging station 470, located approximately 25 minutes away, and they have the AC running on full power (high), this usage if continued during the trip will impact the battery SoC. In some embodiments, the concierge system 480 can receive real-time vehicle load data to update its prediction. For example, if the current AC use conditions continue, the concierge system 480 can predict there will be a greater depletion of the battery before the vehicle's arrival. In some embodiments, concierge system 480 can use HVAC data to also determine the operating conditions for the battery itself, which can affect its performance and discharge rate. As a general matter, electric vehicles can charge more efficiently in warmer conditions, so if the vehicle temperature can be adjusted to pre-warm the battery pack, charging can be more effective, which would impact the time the vehicle would be required to park at the charging site. Similarly, if the vehicle is carrying a higher load (weight), such as multiple passengers, luggage, or even towing cargo, the rate of consumption can also be affected, and so each of these datapoints, as sensed by vehicle 300, can be incorporated into the SoC projection calculated by the concierge system 480.

Referring to FIG. 6A, an embodiment showcasing a first set of preauthorization stages (A)-(E) are described as second vehicle 300 travels a first segment 520 of its route toward second charging station 470. Although the sequence is presented in alphabetical order, it should be understood that the operations performed or data collected at each of these stages need not occur in the presented sequence, but can occur in a different order, or at the same time as each other, and/or some stages may be omitted. As shown in FIG. 6A, at a first stage (A), the distance (e.g., miles or km) the second vehicle 300 is slated to travel before arrival at the charging station as well as its route details can be identified and shared with the concierge system 480. In a second stage (B), traffic, roadway, and/or environmental condition data can be retrieved (e.g., see FIG. 4) by the concierge system 480. At a third stage (C), the second vehicle's estimated time of arrival (ETA) at the charging station can be provided to the concierge system 480. In some embodiments, a fourth stage (D) includes the concierge system 480 pinging the charging station computing system to obtain current charging activity by vehicles at its facility to determine whether and approximately how long of a wait time the second vehicle 300 may experience before a charging station becomes available after the second vehicle 300 has arrived at the second charging station 470 and charging can actually commence. The concierge system 480 can, at a fifth stage (E), also generate a prediction describing the SoC of the battery for second vehicle 300 at the time its charging session is estimated to begin.

Moving now to FIG. 6B, the second vehicle 300 is depicted as it travels along a second segment 530 of its route. The concierge system 480 can at a sixth stage (F) output an estimate of the duration of the vehicle's upcoming charging session, and at a seventh stage (G) generate an estimate of battery consumption (if any) that will occur during the charging session itself. In addition, during an eighth stage (H), the concierge system 480 can access the electric price rate (by reference to the tariff schedule) to identify what the cost (e.g., per kWh) for fuel will be during the time the second vehicle engages in the charging session. At a ninth stage (I), the concierge system 480 can calculate a cost representation that will cover the "fill up" during the upcoming fueling session. Based on the value that is calculated, the concierge system 480 can transmit a preauth request to the payment ecosystem associated with the second charging station 470, before the vehicle arrival at a charging site 510 in a tenth stage (J) and the charging session is actually started.

Finally, an eleventh stage (K) comprises steps that complete the preauthorization is depicted in FIG. 6C. Eleventh stage (K) can include a sequence of operations in which communications through the payment ecosystem 580 are performed. In some embodiments, payment ecosystem 580 can comprise a transaction processing network that may include a network that can process and route transaction request messages. An example transaction processing network may include data processing subsystems, networks, and operations used to support and deliver authorization services, exception file services, transaction scoring services, and clearing and settlement services. Transaction processing networks are able to process credit card transactions, debit card transactions, and other types of commercial transactions, and perform clearing and settlement services.

For example, the concierge system 480 can provide driver payment details 620 to the merchant's payment gateway 640 with a request for preauth corresponding to (or based on) the predicted cost of the upcoming transaction at a first step (1). In different embodiments, an "authorization request message" may be an electronic message that is sent to request authorization for a transaction. The authorization request message can be sent to a transaction processing network and/or an issuer of a transaction account. An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

In some embodiments, the request can trigger the return of an electronic message reply to an authorization request message, referred to as an "authorization response message". The authorization response message can be generated by an issuing financial institution or a transaction processing network. The authorization response message may include, by way of example only, one or more of the following status indicators: Approval—transaction was approved (i.e., success); Decline—transaction was not approved (i.e., fail); or Call Center-response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

Upon receipt of the authorization response message, a preauth status can be generated at a second step (2), which can optionally be shared with the concierge system 480, and through the concierge system 480, back to the second driver 310 (e.g., via a user interface of the second vehicle 300, such as display 340). If the preauth is successful, the upcoming transaction can be authorized to run, and a hold placed on the driver's funds in the amount of the preauth. If the preauth fails, the upcoming transaction can be blocked until the driver provides alternate payment details or otherwise addresses the reason for the failure. At a third step (3), the vehicle can conduct and complete its charging session (if preauth was successful), and a final cost of the transaction tallied. In a fourth step (4), the actual cost of the transaction can be captured, for example by use of the preauth amount that was being held, and transferred to merchant account 642 as a settlement. The cost should be substantially similar to the previously calculated estimate. Any minor differences in the two amounts can be settled with little impact to the customer's fund availability.

It can be appreciated that there may be occasions where the predicted transaction fails to occur. For example, a vehicle may make an unexpected stop or detour that means the charging event that was expected to take place at a first charging station does not happen. In another example, the vehicle may select a different charging station for refueling. In some embodiments, the vehicle may suffer a breakdown or be involved in an accident, and no longer travel to the selected charging station. Thus, in different embodiments, the period in which the preauthorization is valid can be conditional on the vehicle arriving at the charging station within a pre-designated window of time. In some embodiments, if the vehicle does not arrive within this window, the preauthorization can be automatically cancelled by the payment ecosystem. In some embodiments, the preauthorization may be automatically renewed if the vehicle stops unexpectedly but persists in identifying the charging station as its ultimate destination. In different embodiments, the cost representation can be adjusted based on the time of day that the vehicle is expected to arrive and if that time changes, the cost can also be dynamically updated. This is particularly true with respect to electric charging stations, which employ a tariff schedule where the price of electricity is variable throughout the day and night. In addition, congestion fees and/or idle fees can also be incorporated into the cost representation if the time at which the vehicle is scheduled to arrive coincides with high volume traffic at the charging station.

Figure 7:
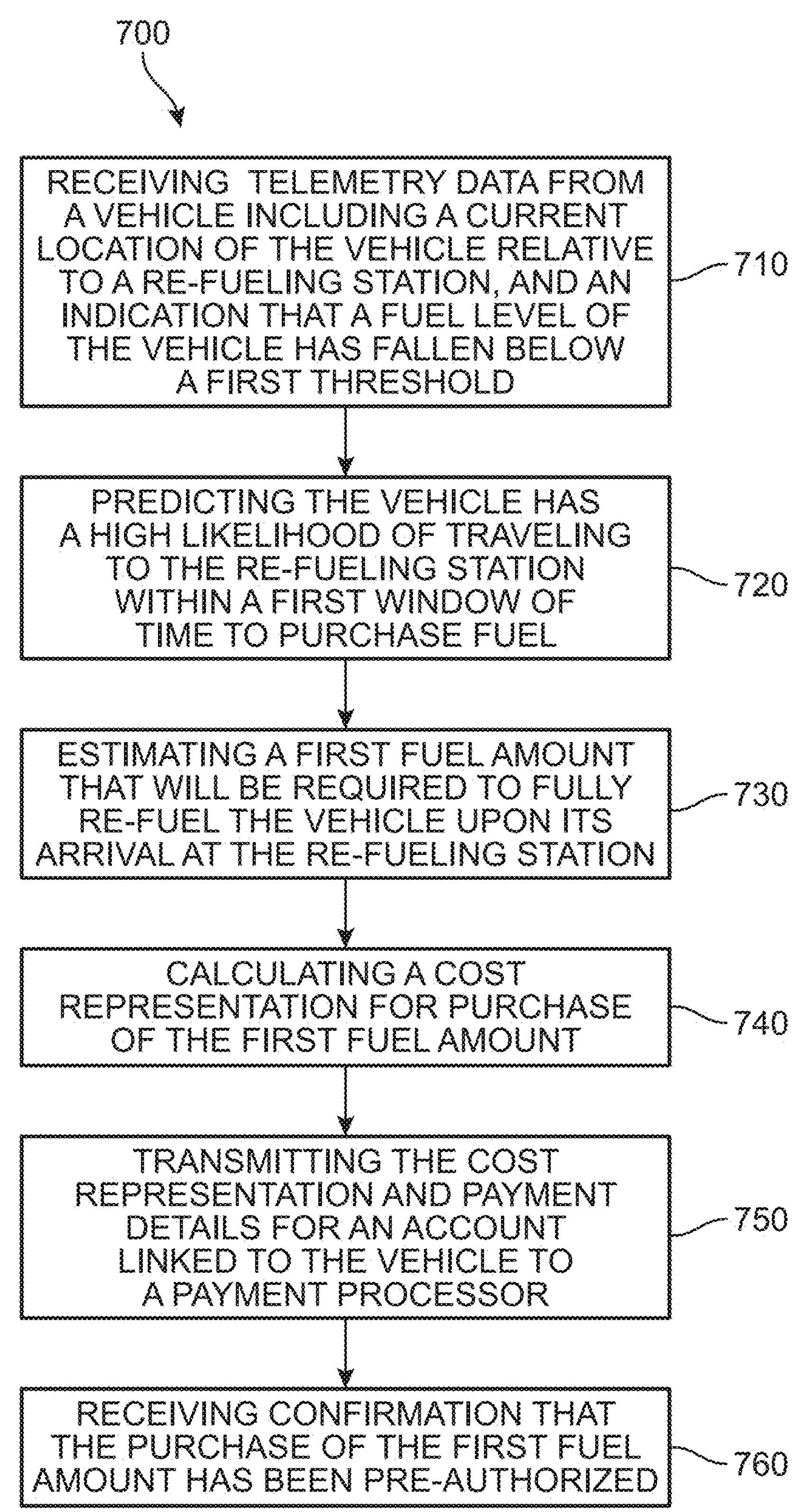
FIG. 7 is a flow chart of a process of optimizing payment processing for vehicle fueling transactions, in accordance with an embodiment of the disclosure.

FIG. 7 is a flow chart illustrating an embodiment of a method 700 for optimizing payment processing for vehicle fueling transactions. At 710, the method may include receiving, at a remote concierge system, first telemetry data from a vehicle including a current location of the vehicle relative to a re-fueling station, and an indication that a fuel level of the vehicle has fallen below a first threshold. At 720, the method includes predicting, at the concierge system, the vehicle has a high likelihood of traveling to the re-fueling station within a first window of time to purchase fuel, and at 730 the method includes estimating, at the concierge system, a first fuel amount that will be required to fully re-fuel the vehicle upon its arrival at the re-fueling station. The method 700 also includes at 740, calculating, at the concierge system, a cost representation for purchase of the first fuel amount. In addition, at 750, the method includes transmitting, from the concierge system and before the vehicle is physically connected to a component of the re-fueling station, the cost representation and payment details for an account linked to the vehicle to a payment processor for the re-fueling station, and at 760, receiving, from the payment processor and at the concierge system, confirmation that the purchase of the first fuel amount has been pre-authorized.

In different embodiments, the method 700 may include additional processes or aspects. In one example, the pre-authorization automatically expires after/as soon as the first window of time passes. In some embodiments, the method also includes receiving, at the concierge system, data indicating a driver of the vehicle has selected the re-fueling station as their target destination via a navigation app onboard the vehicle. In one embodiment, the vehicle is an electric vehicle, and the fuel level refers to a state of charge (SoC) of a battery for the electric vehicle.

In some embodiments, the method further includes receiving, at the concierge system, battery-related data including one or more of an age of the battery, a make and model of the battery, and historical charging and discharging rates for the battery, where the battery-related data is used to estimate the first fuel amount. In another embodiment, the method also includes receiving, at the concierge system, vehicle usage-related data including one or more of a weight load carried by the vehicle including passengers and cargo, and activity data for a Heating, Ventilation, and Air Conditioning (HVAC) system of the vehicle, where the vehicle usage-related data is used to estimate the first fuel amount. In different embodiments, the method can also include receiving, at the concierge system, historical driving behavior data for a current driver of the vehicle, where the historical driving behavior data is used to estimate the first fuel amount.

In some embodiments, the method further includes receiving, at the concierge system, information about a planned route to the re-fueling station from the vehicle's current location; and pulling, from a traffic database, real-time traffic data for traffic along the planned route, where the real-time traffic data is used to estimate the first fuel amount. In different embodiments, the method also includes receiving, at the concierge system, information about a planned route to the re-fueling station from the vehicle's current location; and pulling, from a weather database, real-time weather data for roadways comprising the planned route, where the real-time weather data is used to estimate the first fuel amount. In another embodiment, the method can include receiving, at the concierge system, information about a planned route to the re-fueling station from the vehicle's current location; and pulling, from a road network database, real-time road conditions data for roadways comprising the planned route, where the real-time road conditions data is used to estimate the first fuel amount. In some embodiments, the method further includes transmitting, from the concierge system and to an onboard computing device of the vehicle, the confirmation, thereby triggering presentation of a notification via a display of the vehicle indicating the transaction has been pre-authorized.

Figure 8:
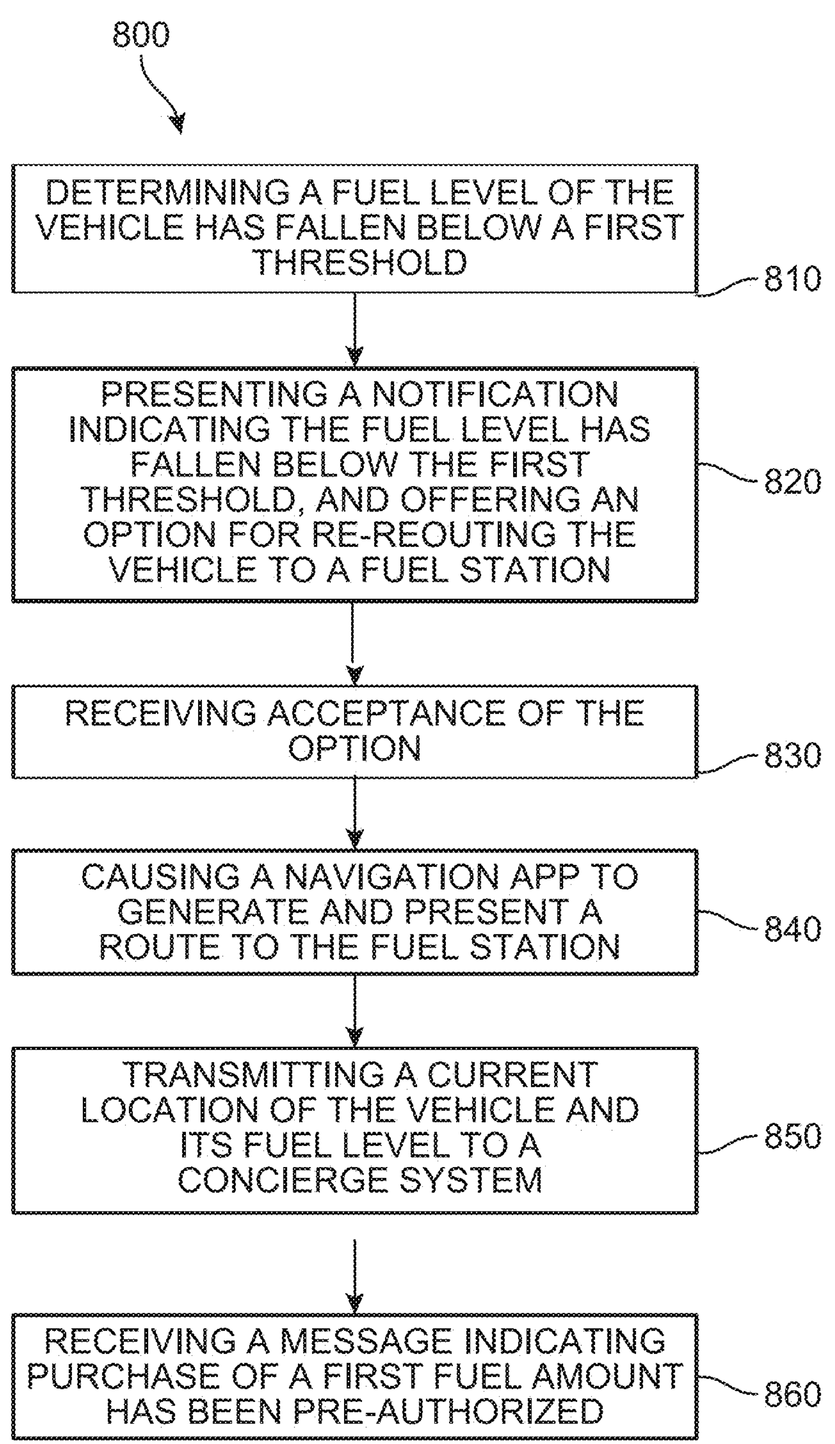
FIG. 8 is a flow chart of a process of optimizing payment processing for vehicle fueling transactions, in accordance with an embodiment of the disclosure.

Other methods may be contemplated within the scope of the present disclosure. For example, as shown in a flow chart 800 of FIG. 8, in some embodiments, another method of optimizing payment processing for vehicle fueling transactions is disclosed. The method includes: a first step 810 of determining, by a concierge service for a vehicle, a fuel level of the vehicle has fallen below a first threshold; a second step 820 of presenting, by the concierge service and via a display or speaker of the vehicle, a first notification: (a) indicating the fuel level has fallen below the first threshold, and (b) offering a selectable option for re-routing the vehicle to a re-fueling station; a third step 830 of receiving, by the concierge service, acceptance of the selectable option; a fourth step 840 of responsively (i.e., in response to the receiving the acceptance) causing a navigation application associated with the vehicle to generate and present a route to the re-fueling station; a fifth step 850 of transmitting, from the concierge service and to a remote concierge system, a current location of the vehicle relative to the re-fueling station, and a current fuel level of the vehicle; and a sixth step 850 of receiving, from the remote concierge system and at the concierge service, before the vehicle is physically connected to a component of the re-fueling station, a message indicating purchase of a first fuel amount has been pre-authorized.

As a general matter, embodiments of the server and service for the concierge systems provided herein are described below. As a general matter, the server may include circuitry, a memory, an I/O device, and a network interface. The circuitry may be coupled to the memory, the I/O device, and the network interface, through wired or wireless connections of the communication networks.

The circuitry may include any suitable special-purpose or general-purpose computer, computing entity, or processing device including various computer hardware or software modules and may be configured to execute instructions stored on any applicable computer-readable storage media (for example the memory). The circuitry may be implemented based on a number of processor technologies known in the art. For example, the circuitry may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry may include any number of processors configured to, individually or collectively, perform any number of operations of the server, as described in the present disclosure. Examples of the circuitry may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory may include suitable logic, circuitry, interfaces, and/or code that may be configured to store the set of instructions executable by the circuitry. The memory may be configured to store the registration information for the transfer devices. The memory may be further configured to store the electric charging information, the renewable credit information, and the monetary information. Examples of implementation of the memory may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device may include suitable logic, circuitry, interfaces, and/or code that may be configured to receive user inputs and generate outputs in response to the received user inputs. The I/O device may receive the registration information associated with a new electric charging facility device as the user-input. For example, the server may receive the user-input from an executive of the organization associated with or handling the server for the REC management. The I/O device may include various input and output devices, may be configured to communicate with the circuitry. Examples of the I/O device may include, but are not limited to, a touch screen, a keyboard, a mouse, a joystick, a microphone, a display device, a speaker, and/or an image sensor.

The network interface may include suitable logic, circuitry, and interfaces that may be configured to facilitate communication between the circuitry, the fueling facility devices, the electronic device of the OEMs, the electric grid device of an electric grid, the communication device of the renewable energy generation sources, and the electronic apparatus of the vehicle, via the communication network. The network interface may be implemented by use of various known technologies to support wired or wireless communication of the server with the communication network. The network interface may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging and a Short Message Service (SMS).

While the server in this case includes the circuitry, the memory, the I/O device, and the network interface, the disclosure should not be construed as limiting the server and may include more or less components to perform the same or other functions of the server. Details of the other functions and the components have been omitted from the disclosure for the sake of brevity. The functions or operations executed by the server may be performed by the circuitry. It should be understood that the server may be combined with the transfer devices to form a system. The transfer devices may be communicably coupled with the network Interface, via a communication network.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A “processor”, as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps or processes. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

The invention claimed is:

1. A method for optimizing payment processing for vehicle fueling transactions, the method comprising:

receiving, at a remote concierge system, first telemetry data from a vehicle including a current location of the vehicle relative to a re-fueling station, and an indication that a fuel level of the vehicle has fallen below a first threshold;

predicting, at the remote concierge system, the vehicle has a high likelihood of traveling to the re-fueling station within a first window of time to purchase fuel;

querying, by the remote concierge system, the re-fueling station to determine current charging activity and an estimated wait time before a charging component becomes available;

estimating, at the remote concierge system, a first fuel amount that will be required to fully re-fuel the vehicle upon its arrival at the re-fueling station, wherein estimating the first fuel amount comprises:

determining a predicted state of charge (SoC) of a battery of the vehicle at a time a charging session is estimated to begin, based on a current SoC, a rate of discharge, a distance to the re-fueling station, the estimated wait time, and a predicted energy consumption of one or more auxiliary vehicle systems during the estimated wait time; and calculating the first fuel amount based on a difference between a full charge capacity of the battery and the predicted SoC at the time the charging session is estimated to begin;

calculating, at the remote concierge system, a cost representation for purchase of the first fuel amount by applying a price rate corresponding to the estimated arrival time to the first fuel amount, wherein the cost representation is dynamically adjusted based on a predicted energy consumption of one or more auxiliary vehicle systems and a predicted wait time at the re-fueling station;

transmitting, from the remote concierge system and before the vehicle is physically connected to a component of the re-fueling station, the cost representation and payment details for an account linked to the vehicle to a payment processor for the re-fueling station; and receiving, from the payment processor and at the remote concierge system, confirmation that the purchase of the first fuel amount based on the cost representation has been pre-authorized.

2. The method of claim 1, further comprising receiving, at the remote concierge system, data indicating a driver of the vehicle has selected the re-fueling station as their target destination via a navigation app onboard the vehicle.

3. The method of claim 1, wherein the vehicle is an electric vehicle, and the fuel level refers to the state of charge (SoC) of the battery for the electric vehicle, and wherein determining the rate of discharge comprises:

receiving, at the remote concierge system, real-time vehicle usage data including a weight load carried by the vehicle; and using the real-time vehicle usage data to calculate a rate of fuel consumption during travel to the re-fueling station.

4. The method of claim 3, further comprising receiving, at the remote concierge system, battery-related data including one or more of an age of the battery, a make and model of the battery, and historical charging and discharging rates for the battery, wherein the battery-related data is used to determine the rate of discharge for estimating the first fuel amount.

5. The method of claim 1, further comprising receiving, at the remote concierge system, vehicle usage-related data including one or more of a weight load carried by the vehicle including passengers and cargo, and activity data for a Heating, Ventilation, and Air Conditioning (HVAC) system of the vehicle, wherein the vehicle usage-related data is used to determine the rate of discharge for estimating the first fuel amount.

6. The method of claim 1, further comprising receiving, at the remote concierge system, historical driving behavior data for a current driver of the vehicle, wherein the historical driving behavior data is used to determine the rate of discharge for estimating the first fuel amount.

7. The method of claim 1, further comprising:

receiving, at the remote concierge system, information about a planned route to the re-fueling station from the vehicle's current location; and pulling, from a traffic database, real-time traffic data for traffic along the planned route, wherein the real-time traffic data is used determine the rate of discharge for estimating the first fuel amount.

8. The method of claim 1, further comprising:

receiving, at the remote concierge system, information about a planned route to the re-fueling station from the vehicle's current location; and pulling, from a weather database, real-time weather data for roadways comprising the planned route, wherein the real-time weather data is used to determine the rate of discharge for estimating the first fuel amount.

9. The method of claim 1, further comprising:

receiving, at the remote concierge system, information about a planned route to the re-fueling station from the vehicle's current location; and pulling, from a road network database, real-time road conditions data for roadways comprising the planned route, wherein the real-time road conditions data is used to determine the rate of discharge for estimating the first fuel amount.

10. The method of claim 1, further comprising transmitting, from the remote concierge system and to an onboard computing device of the vehicle, the confirmation, thereby triggering presentation of a notification via a display of the vehicle indicating the transaction has been pre-authorized.

11. A method for optimizing payment processing for vehicle fueling transactions, the method comprising:

determining, by a remote concierge service for a vehicle, a fuel level of the vehicle has fallen below a first threshold;

presenting, by the remote concierge service and via a display or speaker of the vehicle, a first notification:

indicating the fuel level has fallen below the first threshold, and offering a selectable option for re-routing the vehicle to a re-fueling station;

receiving, by the remote concierge service, acceptance of the selectable option;

responsively causing a navigation application associated with the vehicle to generate and present a route to the re-fueling station;

transmitting, from the concierge service and to a remote concierge system, a current location of the vehicle relative to the re-fueling station, and a current fuel level of the vehicle; and wherein the remote concierge system:

queries the re-fueling station to determine current charging activity and an estimated wait time before a charging component becomes available;

predicts a state of charge (SoC) of the vehicle at a time a charging session is estimated to begin based on the estimated wait time and a predicted energy consumption of one or more auxiliary vehicle systems during the estimated wait time; and calculates a cost representation for a first fuel amount based on a difference between a full charge capacity and the predicted SoC at the time the charging session is estimated to begin; and receiving, from the remote concierge system and at the concierge service, before the vehicle is physically connected to a component of the re-fueling station, a message indicating purchase of the first fuel amount has been pre-authorized.

12. A system for optimizing payment processing for vehicle fueling transactions, the system comprising a processor and machine-readable media including instructions which, when executed by the processor, cause the processor to:

receive, at a remote concierge system, first telemetry data from a vehicle including a current location of the vehicle relative to a re-fueling station, and an indication that a fuel level of the vehicle has fallen below a first threshold;

predict, at the remote concierge system, the vehicle has a high likelihood of traveling to the re-fueling station within a first window of time to purchase fuel;

estimate, at the remote concierge system, a first fuel amount that will be required to fully re-fuel the vehicle upon its arrival at the re-fueling station based on real-time vehicle usage data including at least one of a weight load carried by the vehicle or activity data for a Heating, Ventilation, and Air Conditioning (HVAC) system of the vehicle, wherein the real-time vehicle usage data is used to calculate a rate of fuel consumption during travel to the re-fueling station and predict a state of charge of the vehicle upon arrival at the re-fueling station;

calculate, at the remote concierge system, a cost representation for purchase of the first fuel amount;

transmit, from the remote concierge system and before the vehicle is physically connected to a component of the re-fueling station, the cost representation and payment details for an account linked to the vehicle to a payment processor for the re-fueling station; and receive, from the payment processor and at the remote concierge system, confirmation that the purchase of the first fuel amount has been pre-authorized.

13. The system of claim 12, wherein the instructions further cause the processor to:

query, by the remote concierge system, the re-fueling station to determine a current charging activity of the re-fueling station and an estimated wait time before a charging component becomes available for the vehicle;

calculate an estimated energy depletion of the battery during the estimated wait time based on a predicted operation of the Heating, Ventilation, and Air Conditioning (HVAC) system while the vehicle is stationary at the re-fueling station; and adjust the cost representation to include a cost of energy corresponding to the estimated energy depletion during the estimated wait time.

14. The system of claim 12, wherein the vehicle is an electric vehicle, and the fuel level refers to the state of charge (SoC) of a battery for the electric vehicle.

15. The system of claim 14, wherein the instructions further cause the processor to receive, at the remote concierge system, battery-related data including one or more of an age of the battery, a make and model of the battery, and historical charging and discharging rates for the battery, wherein the battery-related data is used to predict the state of charge of the vehicle upon arrival for estimating the first fuel amount.

16. The system of claim 12, wherein the instructions further cause the processor to receive, at the remote concierge system, vehicle usage-related data including one or more of a weight load carried by the vehicle including passengers and cargo, and activity data for a Heating, Ventilation, and Air Conditioning (HVAC) system of the vehicle, wherein the vehicle usage-related data is used to estimate the first fuel amount continuously update the predicted state of charge of the vehicle upon arrival based on changes to the real-time vehicle usage data received during travel to the re-fueling station.

17. The system of claim 12, wherein the instructions further cause the processor to receive, at the remote concierge system, historical driving behavior data for a current driver of the vehicle, wherein the historical driving behavior data is used to predict the state of charge of the vehicle upon arrival for estimating the first fuel amount.

18. The system of claim 12, wherein the instructions further cause the processor to:

receive, at the remote concierge system, information about a planned route to the re-fueling station from the vehicle's current location; and pull, from a traffic database, real-time traffic data for traffic along the planned route, wherein the real-time traffic data is used to predict the state of charge of the vehicle upon arrival for estimating the first fuel amount.

19. The system of claim 12, wherein the instructions further cause the processor to:

receive, at the remote concierge system, information about a planned route to the re-fueling station from the vehicle's current location; and pull, from a weather database, real-time weather data for roadways comprising the planned route, wherein the real-time weather data is used to predict the state of charge of the vehicle upon arrival for estimating the first fuel amount.

20. The system of claim 12, wherein the instructions further cause the processor to:

receive, at the remote concierge system, information about a planned route to the re-fueling station from the vehicle's current location; and pull, from a road network database, real-time road conditions data for roadways comprising the planned route, wherein the real-time road conditions data is used to predict the state of charge of the vehicle upon arrival for estimating the first fuel amount.

* * * * *